United States Patent Office 3,470,714
Patented Oct. 7, 1969

3,470,714
METHOD OF AND AN APPARATUS FOR CONTROLLING ELECTROMECHANICAL ORGAN WITH ON-OFF OPERATION IN ACCORDANCE WITH A DIGITAL PROGRAM IN A MACHINE HAVING A VARIABLE OPERATING SPEED
André Corbaz, 20 bis route de Drize, Carouge, Geneva, Switzerland
Filed Feb. 3, 1965, Ser. No. 430,157
Claims priority, application Switzerland, Feb. 4, 1964, 1,278/64
Int. Cl. D04b *15/68;* H04q *3/00*
U.S. Cl. 66—50      4 Claims

ABSTRACT OF THE DISCLOSURE

Method and apparatus are provided for controlling at least one electromechanical member having ON-OFF operation initiated by periodic program signals represented either by the presence or by the absence of electric pulses and having to operate in a machine, such as a knitting machine, at a rate proportional to the operating speed of the machine, the program signals referred to being produced according to a digital program driven at a mean speed that is proportional to the operating speed of the electromechanical member. A pulse sequence is selected from a plurality of pulse sequences in phase leading relationship each of a different phase to one another and the pulse sequence selected is attributed to a corresponding range of a plurality of successive ranges of increasing values of the machine operating speeds, the frequencies of the sequences being equal to the ON-OFF operation rate of the electromechanical member, the total amount of time between the first and last phases of the several sequences being shorter than duration of each of the program signals and the pulses in the sequences having pulse duration shorter than pulse duration of the program signals. Control of the electromechanical member is had according to relations which result depending upon when the program signals and the pulses in the selected pulse sequence occur and the positional state of the electromechanical member leading up to the occurrence.

---

This invention relates to the control of electromechanical members in accordance with a digital program.

An object of this invention is to provide a method for controlling electromechanical members having ON-OFF operation and an invariable time constant by means of electric pulses, according to a digital program, said members being adapted to operate successively in a machine having a variable operating speed.

Further objects of the invention are to provide an apparatus for carrying out said method and as well as the application of said method to the control of a knitting machine provided with electromagnetic selectors for the jacks and governed by a punched program tape.

Machines comprising electromechanical members adapted to operate with ON-OFF action according to a digital program are well known and in particular machines of the transfer type in which the electromechanical members with ON-OFF action have to co-operate with one or several elements which pass by in front of said members and which have a movement which is synchronous with that of the program. Knitting machines constitute a particular example of this type and comprise a set of jacks destined to act upon the needles passing by in front of the electromagnetic selectors which have the function of selecting only those of the jacks passing by which have to act upon the needles. This is illustrative of an "ON-OFF" operation; the latter operation in this particular instance being carried out during passage of the jacks, said passage being synchronous with the movement of the program which includes the individual orders for the selection of said jacks.

In a machine of the above mentioned type, the time source of serious difficulties when the machine is reconstants of the electromechanical members constitute a quired to operate at variable rates. The time constant of an electromechanical member expressed as a fraction of the elementary cycle of the machine (e.g. in the knitting machine, the elementary cycle is the duration required for a given jack to be replaced at a given location by the one immediately subsequent thereto and the feed movement corresponding thereto represents an elementary step of the machine), will in fact very with the operating rate, i.e. with the speed of the machine. At low operating speeds of the machine, the elementary cycle will be long so that the time constant only constitutes a small fraction thereof and may thus be neglected. At high rates, however, the elementary cycle becomes shorter and the time constant may represent an appreciable fraction thereof. Thus, unless means are provided for compensating this variable influence of the time constant, the desired action will not occur at the proper instant, so that the machine will not function satisfactorily.

Several solutions have been proposed for this problem, which is by no means new. It is thus known to effect compensation for the influence of the time constant by advancing the phase of the electric pulses obtained by the program, this being done by an amount which is proportional to the speed of the machine. This allows any delay caused by the time constant to be made up and the mechanical result to be obtained at the required moment, thus ensuring correct operation of the machine. The known methods for effecting this variable advance in phase, consist in acting mechanically on the physical support of the digital program (e.g. punched tape) or in changing the position of the program reader. These known methods require relatively complicated mechanical devices which are difficult to construct, and their adjustment is delicate as well as unstable. These devices are also subject to wear and hysteresis phenomena appear, which are mainly due to parasitic friction.

A further difficulty inherent in the control of electromechanical members by means of a digital program is due to the fact that the instant of appearance of the signal at the outlets of the various readers may vary considerably. This may be due either to differences in the sensitivity of the various readers (this being particularly the case with photo-electrical readers), or to inequalities in the shape of the readers (in particular, brush readers), or even to inequalities in the physical shape which the informations assume on the tangible support of the program (e.g. irregularity in the form and the centering of the holes in the case of a program constituted by a punched tape). These irregularities in the instant of appearance of the signal at the outlet of the different readers lead to difficulties in cases where a good synchronization of the entry into action of the electromechanical members with the running of the machine has to be ensured, and also when the entry into action of the members with respect to each other has to be brought into phase accurately.

Finally, digital programs do not always allow informations to be extended over a length which is equal to, or greater than, an elementary forward movement of the program carrier, which corresponds to an elementary step of the machine. This is particularly the case in a program carrier which assumes the form of a tape wherein it is not advisable such as because of strength impairment of the tape to punch an elongated hole which would continue in the tape for several steps of the machine. If, therefore, an electromechanical member is to remain in action during several elementary cycles of the machine, a control must be provided which, when arranged between the reader and the said member, permits an information to be made to last as long as may be necessary to prevent the electromechanical member from being brought out of action each time that the portion of the program carrier included between two consecutive holes or the equivalent passes in front of the reader.

An object of this invention is to provide a control method which eliminates these disadvantages by applying logical operations of comparison, of selection and of memorization. This method more particularly provides for controlling at least one electromechanical member having ON-OFF operation initiated by periodic program signals represented either by the presence or by the absence of electric pulses and having to operate in a machine at a rate proportional to the operating speed of the latter, said program signals being produced according to a digital program driven at a mean speed that is proportional to said operating speed, the method including: generating a plurality of pulse sequences each having a frequency equal to the frequency of said ON-OFF operation rate and said sequences being phase shifted leading one another for the total amount of time between the first and last phases of said sequences to be shorter than the duration of each of said program signals, the pulses in said sequences having pulse duration shorter than pulse duration of said program signals and each of said sequences being attributed to a corresponding range of a plurality of successive ranges of increasing values of said machine operating speeds; selecting the one said pulse sequence which corresponds to the actual operating speed of said machine, and transmitting information of a said program signal to said electromechanical member only when a pulse of said selected sequence appears; and maintaining said electromechanical member in a program signal imposed position established by said program signal until a next pulse of the selected sequence appears.

Another object of the invention is to provide an apparatus for carrying out the said method. This apparatus is thus for controlling at least one electromechanical member having ON-OFF operation initiated by periodic program signals represented either by the presence of or by the absence of electric pulses and having to operate in a machine at a rate proportional to the operating speed of the latter, the program signals being produced according to a digital program driven at a mean speed that is proportional to the operating speed of the machine and there being pulse sequence and tachometric pulse generator means for producing a plurality of pulse sequences and tachometric pulses, each sequence corresponding to one of a plurality of successive ranges of increasing values of operating speeds of said machine and having a frequency equal to the frequency of said ON-OFF operation rate and the pulses in said sequences having pulse duration shorter than pulse duration of said program signals, said sequences being phase leading shifted with reference to one another for the total amount of time between the first and last phases of said sequences to be shorter than the pulse duration of each of said program signals, and said tachometric pulses having a period inversely proportional to said machine operating speed; said apparatus comprising: a tachometric circuit provided with an input for receiving said tachometric pulses and with outputs to deliver simultaneous tachometric signals produced in any one of a number of significant relations by said tachometric circuit for each said relation of said simultaneous signals to represent a different range in which the actual operating speed of the machine falls; a synchronizing circuit provided with a plurality of main inputs each for receiving one of said pulse sequences, with auxiliary inputs for receiving said tachometric signals, and with an output interrelated with said main and auxiliary inputs for said synchronizing circuit to select the one of said pulse sequences which corresponds to said relation of tachometric signals and issue control pulses at said output with said control pulses being shorter in duration than said program signals; and a control circuit for each said electromechanical member provided with a main input to receive the one of said succession of program signals which is destined for controlling said electromechanical member, with an auxiliary input connected to the output of said synchronizing circuit for receiving said control pulses, and with at least one output to be connected to said electromechanical member, said control circuit comprising gate means and bistable means, said gate means being arranged to transmit information of a said program signal to said bistable means only at the moment when one of said control pulses is received at said auxiliary input of said control circuit, and said bistable means being arranged for maintaining program signal imposed state until a next said control pulse appears at said auxiliary input of said control circuit.

A further object of the invention is to adapt the above mentioned apparatus to the control of a knitting machine. Such an apparatus is characterized in that an input lead of the tachometric circuit of said apparatus and the input leads of the synchronizing circuit thereof are connected to the pulse generator, in that the output leads of the control circuits are connected to the electromagnetic selectors, and in that an input lead of each of said control circuits is connected to a reader associated with that track of said digital program which corresponds to the selector controlled by said control circuit.

The accompanying drawing shows, by way of example, an embodiment of the apparatus according to the invention as well as an application of said apparatus to a knitting machine.

Figure 3:
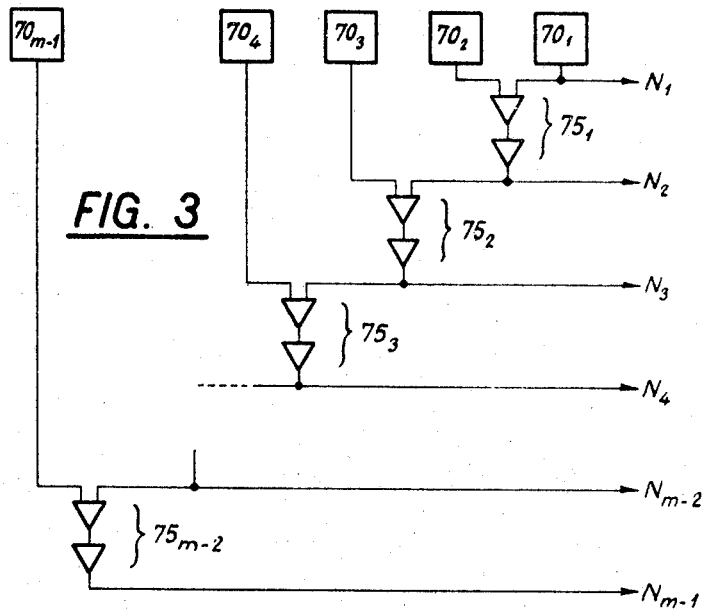
Figure 4:
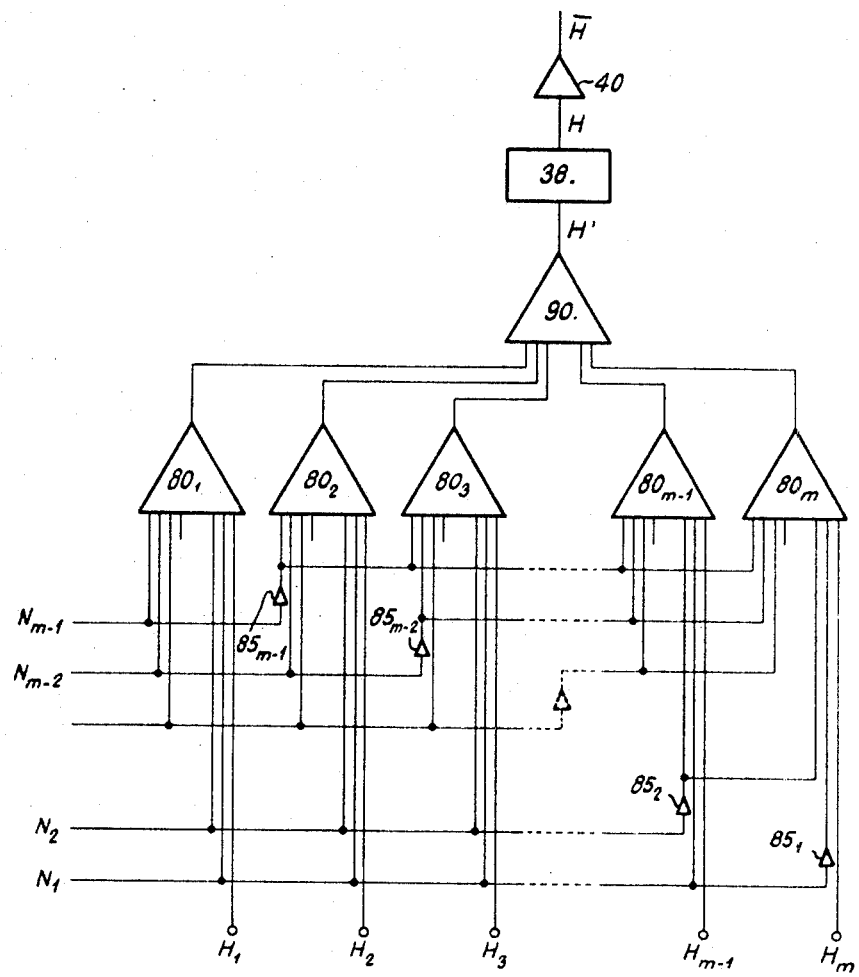

FIGS. 3 and 4 relate to modifications of two parts of the apparatus.

Figure 5:
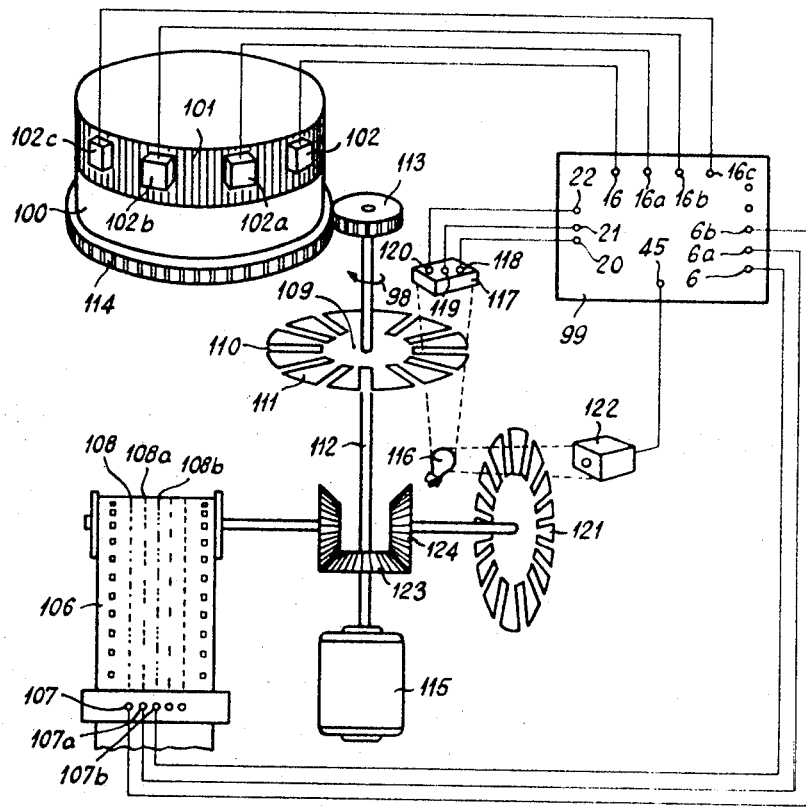

FIG. 5 illustrates the application to a knitting machine.

The following description relates to an example of an embodiment of the apparatus for carrying out the above described method. This example relates to the case in which three electromechanical members are to be controlled according to a digital program and in which the range of operating speeds of the machine has been subdivided into three partial ranges.

Figure 1:
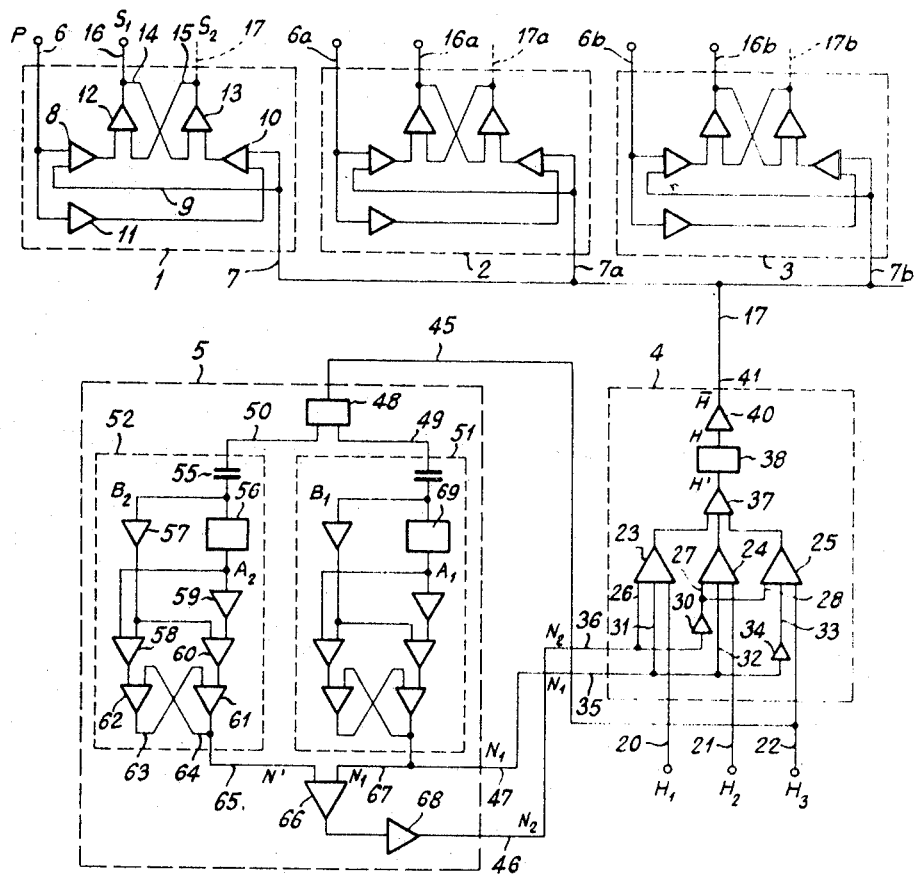
FIG. 1 is an electric diagram relating to a particular embodiment of the apparatus.

The apparatus for carrying out said method comprises essentially the circuits shown in FIG. 1, i.e. control circuits 1, 2, 3, a synchronizing circuit 4 and a tachometric circuit 5.

The control circuits 1, 2 and 3 are identical so that it will suffice to describe only one, in the present case the control circuit 1. The latter comprises an input line 6 by which signals arrive in the form of so-called "program" pulses which may be supplied by the program, e.g. by a punched tape. Said program tape or the like, as well as the reading devices associated therewith which produce said program pulses have not been shown, the devices in question being of a known type. It is only important that electric pulses reach the control circuit 1 by the line 6, said pulses following one another in accordance with any desired program of operation which the electromechanical member associated with said control circuit has to carry out. The control circuit 1 comprises further an auxiliary input line 7 by which it receives so-called synchronizing pulses produced by the synchronizing circuit 4 which will be described more fully hereinafter. The program pulses arriving by the line 6 act on a first logical element 8 of the NOR type which also receives, by means of a line 9, the synchronizing pulses conveyed by an auxiliary line 7. A second logical element 10, which is likewise of the NOR type, is acted upon on the one hand by the synchronizing pulse coming from the auxiliary line 7 and, on the other hand is acted upon by the logical complement of the program pulse, this complement being produced by an inverser 11. The outputs of the elements 8 and 10 are fed into two other logical elements 12 and 13 respectively which are also of the NOR type and are interconnected by lines 14 and 15 so as to form a memory element. The outlet of one of these elements 12 or 13, e.g. the outlet 16 of the element 12, constitutes the output line of the control circuit, said line being connected to the corresponding electromechanical member. The latter has not been shown in FIG. 1 as the construction thereof is arbitrary and does not constitute a part of the invention. As has already been stated, all the control circuits are identical; their part lines 6, 6a, 6b and their output lines 16, 16a, 16b are independent of one another while their auxiliary input lines 7, 7a, 7b are interconnected and are connected, by a line 17, to the outlet of the synchronizing circuit 4.

The synchronizing circuit 4 comprises three main input lines 20, 21, 22 and two auxiliary input lines 35, 36. The main input lines each deliver one of three signal sequences which are produced by a pulse generator (not shown) driven by the machine, said sequences comprising one pulse for each elementary cycle of the machine and having a progressive advance in phase from one sequence to the next. Thus, the sequence $H_2$, which is applied at the inlet 21 leads with respect to the sequence $H_1$ which is applied at the inlet 20, and the sequence $H_3$ which is applied at the inlet 22 leads with respect to the sequence $H_2$, the added value of all said leads being inferior to the duration of a program pulse. These pulse sequences each act on one of the input leads of the logical elements 23, 24, 25 respectively. These elements are also of the NOR type and each comprises three input leads. The first input lead 26 of the element 23 is connected directly to the auxiliary input line 36 which transmits thereto a selecting signal produced, as will be seen hereinafter, by the tachometric circuit 5, while the first input leads 27 and 28 of the elements 24 and 25 respectively are connected indirectly to this same auxiliary line 36 by means of an inverser 30 which supplies the complement of the selecting signal carried by said line. The second input leads 31 and 32 of the logical elements 23 and 24 respectively are directly connected to the second auxiliary input line 35, while the second input lead 33 of the element 25 is indirectly connected to said second auxiliary line 35 by means of an inverser 34 which delivers the complement of the selecting signal carried by said line. The outlets of the three elements 23, 24 and 25 act on a fourth logical element 37, also of the NOR type, which acts, in turn, on a monostable multivibrator 38 which produces rectangular pulses having a well determined width, of which the inverser 40 provides the complements. These complements constitute the proper synchronizing pulses which appear at the output lead 41 of the synchronizing circuit 4 and which are transmitted, as seen above, to the control circuits 1, 2 and 3.

Referring to the tachometric circuit 5, this circuit comprises an input line 45 by which it receives the signals delivered by the pulse generator (not shown), and two output leads 46 and 47 for delivering selecting signals which are produced, as will be seen hereinafter, by the tachometric circuit itself. The signals delivered by the pulse generator are here the same as those appearing at the input line 22 of the synchronizing circuit 4, the lines 45 and 22 being interconnected for this reason. The input line 45 leads to a bistable multivibrator 48 of which the two output leads 49 and 50 constitute the input leads of two sub-circuits 51 and 52 respectively. The sub-circuit 52 comprises a differentiating condenser 55, which acts in parallel on a monostable multivibrator 56 and on an inverser 57 serving to give the logical complement of the signal produced by the condenser 55, a first logical element 58 of the NOR type having two inputs, which is acted on by the multivibrator 56, a second logical element 60, likewise of the NOR type and having two inputs, which is indirectly acted on by the multivibrator 56 by means of an inverser 59. The second input leads of said logical elements 58 and 60 are both connected to the output lead of the inverser 57. Said logical elements 58 and 60 in turn act on two further logical elements 62 and 61 respectively, both of the NOR type, which are interconnected in push-pull connection by the lines 63 and 64. The output lead 65 of the logical element 61 also constitutes the output lead of the sub-circuit 52 and is connected to one of the two input leads of a further logical element 66, also of the NOR type. The other input lead of said element 66 is connected to the output lead 67 of the sub-circuit 51. The latter is constituted in the same manner as the sub-circuit 52, the outlet 67 thereof, however, being connected, in addition, to the line 47 which connects the tachometric circuit 5 to the synchronizing circuit 4. Furthermore, the switching time $T_1$ (i.e. the duration of the metastable state) of the monostable multivibrator 69 is one half the switching time $T_2$ of the monostable multivibrator 56 of the sub-circuit 52. An inverser 68 provides the complement of the signal produced by the element 66 and applies said complement to the other line 46 which connects said tachometric circuit 5 to said synchronizing circuit 4.

Figure 2:
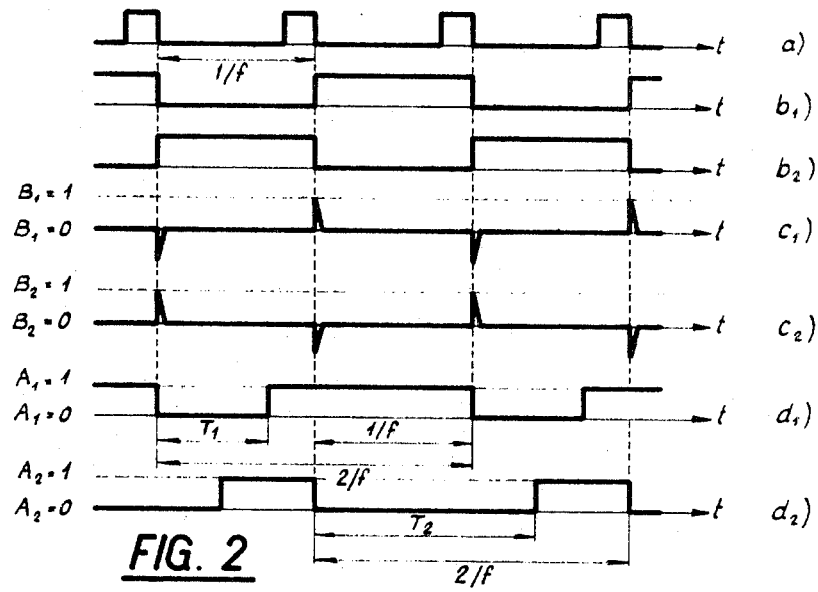
FIG. 2 is a set of diagrams which elucidate the manner in which this particular embodiment functions.

The operation of the above described apparatus is as follows: The tachometric circuit 5 receives, by its inlet 45, signals delivered by the pulse generator which are tooth shaped as is represented by the curve $a$ of FIG. 2, there being one tooth for each elementary cycle of the machine. If the speed of the latter be designated by $f$, counted in elementary cycles per second, the time separating two consecutive teeth is $1/f$. The bistable multivibrator 48 delivers, under the influence of the said signals, the two opposed rectangular waves $b_1$ and $b_2$ of FIG. 2, which both have a duty cycle of 1/2. This multivibrator is arranged in such manner that the leading fronts of said rectangular waves coincide with the trailing fronts of the teeth of the curve $a$. These rectangular waves are led to the sub-circuits 51 in the case of the first $b_1$ and to 52 for the second $b_2$. Referring to the sub-circuit 52, the condenser 55 differentiates the rectangular wave $b_2$ and provides the pulses represented by the curve $c_2$. The monostable multivibrator 56 produces a rectangular wave of the type represented by the curve $d_2$; the duty cycle thereof amounts to $$1 - \frac{f \cdot T_2}{2}$$

i.e. the period thereof is equal to $2/f$, and the depression between two consecutive teeth has a duration $T_2$ which is none other than that which has been designated above as the switching time of the monostable multivibrator 56. It is proposed to designate by $A_2$ the logical variable which is represented by this rectangular wave and it is stipulated that $A_2 = 1$ when the tooth is present, i.e. during the portion $2/f - T_2$ of each period, and that $A_2 = 0$ during the depressions having a duration $T_2$. It is further proposed to designate by $B_2$ the logical variable which is represented by the sequence of pulses represented by the curve $C_2$ and it is stipulated that $B_2 = 1$ when the positive pulse exists and that $B_2 = 0$ in the absence of said positive pulse. The logical variable which constitutes the electric state in the output lead 65 will be designated by N'. It will be readily seen that these variables are connected by the relationship $$N' = \overline{A}_2 \cdot B_2 + \overline{B}_2 \cdot N'^*$$

N'* representing the state of the output lead 65 in the immediately preceding elementary cycle. Table I below indicates all the possible states.

TABLE I

| $A_2$ | $B_2$ | $N'^*$ | $N'$ | Rate |
|---|---|---|---|---|
| 0 | 0 | 0 | 0 | |
| 0 | 0 | 1 | 1 | |
| 0 | 1 | 0 | 1 | } Medium and high. |
| 0 | 1 | 1 | 1 | |
| 1 | 0 | 0 | 0 | |
| 1 | 0 | 1 | 1 | |
| 1 | 1 | 0 | 0 | } Low. |
| 1 | 1 | 1 | 0 | |

The case when $A_2=0$, $B_2=1$, $N'=1$ thus corresponds to the case illustrated by the curves $c_2$ and $d_2$ in which the duration of the elementary cycles is inferior to the switching time $T_2$. Since it has been stipulated that $T_2=2T_1$, this case corresponds to the medium and high speeds of the machine. The case when $A_2=1$, $B_2=1$, $N'=0$ corresponds to the low speeds of the machine, for which $1/f > T_2$.

A similar analysis of the sub-circuit 51, to which one may assign the logical variables $A_1$, $B_1$ and $N_1$, which are analogous to the variables $A_2$, $B_2$ and $N'$, leads to the relationship $$N_1 = \overline{A}_1 \cdot B_1 + \overline{B}_1 \cdot N_1^*$$

and Table II indicates all the possible states.

TABLE II

| $A_1$ | $B_1$ | $N_1^*$ | $N_1$ | Rate |
|---|---|---|---|---|
| 0 | 0 | 0 | 0 | |
| 0 | 0 | 1 | 1 | |
| 0 | 1 | 0 | 1 | } High. |
| 0 | 1 | 1 | 1 | |
| 1 | 0 | 0 | 0 | |
| 1 | 0 | 1 | 1 | |
| 1 | 1 | 0 | 0 | } Medium and low. |
| 1 | 1 | 1 | 0 | |

The case when $A_1=0$, $B_1=1$, $N_1=1$ corresponds to the case in which the duration of the elementary cycles of the machine is inferior to the switching time $T_1$, thus to the high operating rates of the machine. The case when $A_1=1$, $B_1=1$, $N_1=0$ corresponds to the medium and low rates for which $1/f > T_1$ and is illustrated by the curves $c_1$ and $d_1$ of FIG. 2.

While the logical variable $N_1$ represents the signal appearing in the output line 47 of the tachometric circuit 5, the logical variable $N_2$ represents the signal appearing in the output line 46 of this tachometric circuit and is given by $$N_2 = \overline{\overline{N}_1 \cdot \overline{N}'} = N_1 + N'$$

Table III indicates all possible cases, together with corresponding rates of the machine.

Table III

| $N_1$ | $N'$ | $N_2$ | Rate |
|---|---|---|---|
| 0 | 0 | 0 | Low. |
| 0 | 1 | 1 | Medium. |
| 1 | 0 | 1 | |
| 1 | 1 | 1 | High. |

The case when $N_1=1$ and $N^1=0$ occurs at rates for which $1/f < 2T_2$. The relationship defining $N_2$ therefore shows that, as soon as $N_1=1$ and whatever the value of $N'$ may be, $N_2$ will always amount to 1. This case thus also corresponds to high rates.

Table III thus represents the different combinations of signals which may appear at the auxiliary input leads 35 and 36 of the synchronizing circuit 4 and which indicate the range of rates in which the machine is located. Let $H_1$, $H_2$, and $H_3$ be the logical variables which represent the signals appearing at the input lines 20, 21 and 22 respectively of the synchronizing circuit 4, and let $H'$ be the logical variable which is represented by the signal appearing as the output of the logical element 37. The analysis of the circuit leads to the following expression for the complement $\overline{H}'$ of $H'$:

$$\overline{H}' = (\overline{H}_1 \cdot \overline{N}_1 \cdot \overline{N}_2) + (\overline{H}_2 \cdot N_1 \cdot \overline{N}_2) + (\overline{H}_3 \cdot N_1 \cdot N_2)$$

In view of the fact that the monostable multivibrator 38 is arranged in such manner that the signal H' which is applied to the input lead thereof is only shortened without any further modification being affected, it will thus deliver an output signal H which has the same logical value as the input signal H'; the values of H', which are given by Table IV ofr the various possible cases, are the same as those of H, the duration being, however, different.

TABLE IV

| $N_1$ | $N_2$ | $\overline{H}'$ | $H = H'_{short}$ | Rate |
|---|---|---|---|---|
| 0 | 0 | $H_1$ | $H_1$ | Low. |
| 0 | 1 | $H_2$ | $H_2$ | Medium. |
| 1 | 1 | $H_3$ | $H_3$ | High. |

It may therefore be seen that the tachometric circuit 5 and the synchronizing circuit 4 together have the effect of not allowing more than one of the signal sequences $H_1$, $H_2$ or $H_3$ delivered by the pulse generator to appear in the line 17. This occurs in accordance with the operating rate of the machine being within a corresponding one of the operating rate ranges, the monostable multivibrators 56 and 69 being adapted for this purpose. This arrangement therefore selects the one or the other of said signal sequences which, as has been mentioned above, are out of phase with respect to each other, the signals applied at the inlet 21 having a given lead with respect to those applied to the inlet 20 and the signals applied to the inlet 22 having a given lead with respect to those applied at the inlet 21.

The manner of functioning of the control circuits remains to be examined. As the latter are all identical, it will suffice to explain the manner of functioning of the control circuit 1, this explanation also applying to the others. The logical analysis of this circuit leads to the following expressions for the logical variables $S_1$ and $S_2$ which constitute the signals appearing at the outlets 16 and 17 respectively:

$$S_1 = H \cdot P + \overline{H} \cdot S_1^*$$
$$S_2 = H \cdot \overline{P} + \overline{H} \cdot S_2^*$$

in which expressions $S_1^*$ and $S_2^*$ represent the values of $S_1$ and $S_2$ in the immediately preceding elementary cycle and P represents the logical variable which constitutes the program signal appearing in the input lead 6, and while H has the same meaning as before. Let it be agreed that the logical variable H will be assigned the value 1 during the whole time in which the monostable multivibrator 38 is in its metastable state and the value 0 when said multivibrator is in its stable state, i.e. that $H = 1$ during the pulses of the sequence $H_1$ selected by the tachometric circuit, and that $H = 0$ in the absence of said pulses. Let it further be assumed that the logical variable P will be assigned the value 1 when the program reader delivers, to the input lead 6, a signal corresponding to the entry into action of the electromechanical member which is controlled by the control circuit 1 and the value 0 in the absence of such a signal. Thus $S_1 = 1$ is the value of the logical variable $S_1$ when this member enters into action and $S_1 = 0$ is the value of this variable when said member is at rest. On this assumption, all the possible cases which satisfy the above logical equations are indicated in Table V.

TABLE V

| | $H^1$ | P | $S_1^*$ | $S_1$ | $S_2^*$ | $S_2$ |
|---|---|---|---|---|---|---|
| (a) | 1 | 0 | 1 | 0 | 0 | 1 |
| | | | 0 | 0 | 1 | 1 |
| (b) | 0 | 1 | 1 | 1 | 0 | 0 |
| | | | 0 | 0 | 1 | 1 |
| (c) | 0 | 0 | 1 | 1 | 0 | 0 |
| | | | 0 | 0 | 1 | 1 |
| (d) | 1 | 1 | 1 | 1 | 0 | 0 |
| | | | 0 | 1 | 1 | 0 |

It will be noted that the joint appearance of a synchronizing pulse ($H_1=1$) and of a program signal ($P=1$) results in making $S_1$ pass from the value $S_1^*=0$ to the value 1 ("registration" of A" 1"), unless $S_1$ already has the value $S_1^*=1$, in which case $S_1$ remains unchanged (line (d) of Table V); the order coming from the program is therefore transmitted if the synchronizing pulse is present simultaneously.

The appearance of a synchronizing pulse ($H_1=1$) in the absence of a program signal ($P=0$) results in transforming $S_1$ from the value $S_1^*=1$ to the value 0 ("registration" of a 0), unless $S_1$ should already have the value $S_1^*=0$, in which case $S_1$ remains unchanged (line (a) of Table V); the synchronizing pulse therefore gives $S_1$ the value 0 if it does not already have this value.

The presence of a program signal ($P=1$) and the absence of a synchronizing pulse ($H_1=0$) has the effect of leaving the value of $S_1$ unchanged (if $S_1^*=1$, $S_1=1$ and if $S_1^*=0$, $S_1=0$); the order coming from the program is therefore not transmitted if the synchronizing signal is absent (line (b) of Table V) and "locking" of the control circuit and "memorization" of the preceding signal takes place.

Likewise, in the simultaneous absence of the synchronizing signal and of a program signal, i.e. when $H_1=0$ and $P=0$ (line (c) of Table V) no change will take place in the value of $S_1$; there is locking of the control circuit and memorization of the previous signal.

In other words, the order coming from the program is transmitted to the electromechanical member only when the synchronizing signal appears, and this order is memorized until the appearance of the subsequent synchronizing pulse takes place, even if the order coming from the program should change in the meantime. Furthermore, should the order given by the program have changed, this change is only transmitted when the immediately following synchronizing pulse arrives. These "locking" and "memorizing" effects are indicated in Table VI.

TABLE VI

|  | H | P | $S_1$ |  |
|---|---|---|---|---|
| "Locking" | 1 | 0 | 0 | "Registration" of a 0. |
|  | 0 | 1 | 0 | {"Memorization" of a 0. |
|  | 0 | 0 | 0 |  |
| "Locking" | 1 | 1 | 1 | "Registration" of a 1. |
|  | 0 | 1 | 1 | {"Memorization" of a 1. |
|  | 0 | 0 | 1 |  |

The synchronizing pulses of each of the three sequences $H_1$, $H_2$ or $H_3$ may be provided by any suitable device for delivering a pulse each time the machine advances by one elementary cycle, this occurring in a phase with respect to said elementary cycle, which is well determined for each of the sequences and which remains strictly invariable. By way of example, an opaque rotatable disc may be used which is driven by the machine with an angular velocity which is equal to a given multiple of that of said machine and which bears a number of slits so that, when arranged between a light source and a photo-electric cell, it produces a series of sudden flashes which said photo-cell converts into electric pulses. In order to obtain the three different pulse sequences, it will suffice to arrange three photo-electric cells having a suitable angular shift therebetween, whereby the desired difference in phase between the three sequences may be realized. Other means may also be used for generating these pulses. They all comprise a set of readers, which are equal in number to the number of synchronizing pulse sequences, and a structure bearing the alternate zones which are distinguishable from one another by the physical property to which the readers are sensitive (alternate magnetic and non-magnetic zones for magnetic readers, alternate opaque and transparent zones for optical readers, alternate conducting and insulating zones for capacitive readers or such as have brushes, and depressions and projections for readers having micro-swtiches, etc.), said structure and said readers being movable with respect to each other and the relative movement occurring at a velocity which bears a well determined relation to that of the machine, the relative velocity being such that a synchronizing pulse is produced for each of the sequences, each time the machine advances by one elementary step.

In the apparatus described above by way of example, the pulses introduced into the input line 45 of the tachometric circuit 5 are themselves the ones which constitute one of the sequences $H_i$, in the present case the sequence $H_3$. This inlet 45 is thus connected to the inlet 22 of the synchronizing circuit 4. It is obvious, however, that this is not indispensable and that the input pulses of the tachometric circuit may come from any suitable source so long as these pulses follow one another at the same rate as the elementary steps with which the machine advances. In this case the machine would have to be equipped with an additional pulse generator which is independent of that supplying the impulses $H_i$.

The control circuits such as circuit 1 comprise two output leads 16 and 17 which carry complementary signals. According to the type of electromechanical member, it is possible to use only one thereof or the two together. If the electromechanical member is such that $S_1=1$ signifies that it enters into action, and if said member is brought back passively into its rest position, e.g. under the influence of a biasing component, only the outlet 16 will be used. If, on the contrary, the electromechanical member is passively brought into its working position by a biasing component, the outlet 17 will be used, so that it will be put out of action by the signal corresponding to $S_2=1$, which is complementary to $S_1=0$. Finally, if the electromechanical member is of the doubly electromagnetically driven type, both outlets 16 and 17 will be used in such manner that it will be brought into action "actively" when $S_1=1$, $S_2=0$ and will be brought "actively" out of action when $S_1=0$, $S_2=1$.

The control circuits such as circuit 1 may be present in any number, the latter depending only on the number of electromechanical members with which the machine is equipped and being equal thereto.

It should be noted that the choice of synchronizing pulse sequences corresponding to three partial ranges of operating rate of the machine was arbitrary and that any suitable number $m$ of sequences may be chosen. It will, however, be necessary to provide a tachometric circuit comprising $m-1$ sub-circuits $70_1 \ldots 70_{m-1}$, which are analogous to the sub-circuits 51 or 52 and to interconnect them by means of NOR element pairs $75_1 \ldots 75_{m-2}$ as shown in FIG. 3. The synchronizing circuit must then be formed in the manner shown in FIG. 4 and comprises $m$ elements $80_1 \ldots 80_m$, of the NOR type each having $m$ input leads. One of said leads of each element constitutes a main input lead and is intended for receiving signals $H_i$ delivered by the pulse generator and constituting the pulse sequence corresponding to that element, the others being connected to the auxiliary input lines $N_1 \ldots N_{m-1}$, some directly and the others indirectly by means of reversing elements $85_1 \ldots 85_{m-1}$. These auxiliary inputs are connected to the corresponding outlets of the tachometric circuit shown in FIG. 3. With regard to the signals $H_i$, it may be observed that these differ in phase with respect to one another; $H_2$ leads with respect to $H_1$, $H_3$ leads with respect to $H_2$, etc., up to $H_m$, the total difference in phase of $H_m$ with respect to $H_1$, however, being less than the duration of an elementary cycle. The output leads of the elements $80_1 \ldots 80_m$ all act on a last NOR element 90, which thus has $m$ input leads and one output lead which delivers the signal H' mentioned above in connection with FIG. 1. This synchronizing circuit further comprises a monostable multivibrator 38 and an inverser 40 as before. The manner of operation of the tachometric circuit in FIG. 3 and of the synchronizing circuit in FIG. 4 respectively is similar in every respect to that described in connection with the corresponding circuits 5 and 4 in FIG. 1.

The control method and apparatus described above are particularly suitable for controlling a knitting machine with a digital program and electromagnetic selection of the jacks, especially a machine of the circular type. A machine of this type comprises a needle bed 100 (FIG. 5) in which the jacks represented by the vertical lines 101 and which act on the needles are mounted, and a set of electromechanical selectors 102 . . . 102c. These selectors are constructed such as in accordance with any of the heretofore known types described and illustrated in United States Patent 3,262,285 Corbaz et al issued July 26, 1966, and ensures the selection of the jacks, i.e., sorting out those which must be "active" from those which must remain "inactive," according to the instructions of the program 106. The jacks are selected successively as a result of the relative movement of the needle bed with respect to the selectors. It is therefore important that a strict synchronization be ensured between the execution of the orders given by the program and the passage of the jacks in front of the selectors. As the selection consists in moving the jacks from an "inactive" to an "active" position or vice versa, the mechanical inertia of said jacks, as well as the electromagnetic inertia of the selectors themselves, attributes a time constant to said selection. Said time constant is independent of the operating rate of the machine but represents, as compared to the elementary cycle (defined as the time required for the substitution of a jack by the one subsequent thereto in front of a given selector), a fraction which varies with said operating rate. It is therefore indispensable also to compensate for this time constant, so as to leave for the execution proper of the selection a major part of the duration of the elementary cycle. That is also the reason why it is very useful to memorize for as long a time as possible the instructions given by the program, in particular such as remain unchanged during several elementary cycles. Thus when the instructions are given in the form of perforations in a tape, as is shown in FIG. 5, it will be very advantageous not to have to interrupt the action of the selectors during passage of that part of the tape which must necessarily separate two consecutive perforations. The control of a knitting machine is thus a particularly advantageous application of the method according to the invention and of the apparatus for carrying out said method.

In this application, the selectors 102 . . . 102c, which form the electromechanical elements to be controlled, are each connected to one of the outlets 16 . . . 16c of the control circuits of the apparatus 99 and the readers 107 . . . 107b, which are assigned to reading the corresponding tracks 108 . . . 108b of the program 106, to the inlet 6 . . . 6b of these same circuits. The apparatus provided for producing the sequences of pulses $H_i$ is any known device suitable for this and for example comprising a shutter 109 which is provided with slits 110 separated by full parts 111 and which is mechanically connected to the needle bed 100, by being mounted on the shaft 112 which drives the latter by means of the gear 113 and the crown wheel 114 from the motor 115, so as to turn in the direction shown by the arrow 98. The shutter disc 109 is arranged between a source of light 116 and a set 117 of photosensitive elements. In the described example, the range of operating speeds has been assumed to be split up into three partial ranges so that there are three photosensitive elements 118, 119, 120 which are connected to the inlets 20, 21 and 22 respectively of the synchronizing circuit of the apparatus 99. These elements are angularly displaced with respect to each other, so that on passage of a slit of the disc 109, the element 120 is illuminated before the element 119, and the latter before the element 118. Due to the rotation of the disc 109, each photosensitive element produces a series of pulse sequences and said sequences differ in phase relatively to one another by an amount which is determined by the angular displacement of the said photosensitive elements. This displacement is less than the distance separating two consecutive slits and the disc 109 bears a number of slits such that, taking into consideration the reduction ratio gear 113=crown gear 114, the passage of a slit 110 and of the opaque part 111 of the disc coincides with the elementary step of the needle bed 100. The pulse sequences produced by the set 117 are therefore displaced in time by a duration which is less than an elementary cycle. Another disc shutter 121 is inserted between the source 116 and another photosensitive element 122 which is connected to the inlet 45 of the tachometric circuit of the apparatus 99. Said second disc shutter 121 is driven by the shaft 112 by means of bevel gears 123 and 124 and is provided with slits the number of which is such that, taking into consideration the reduction ratio of pair of bevel gears 123, 124, the element 122 delivers one primary pulse per elementary cycle.

The apparatus thus connected to the knitting machine ensure perfect synchronization between the execution of the instructions registered on the program tape and the passage of the jacks in front of the selectors and, due to the faculty of memorizing with which the control circuits are endowed, it effects a virtual extension of the program instructions. This extension is such that, it avoids having the full part separating two consecutive perforations of the ribbon interrupt the excitation of the selector and reduce the duration of its action, this being particularly the case when several consecutive jacks have to be selected.

I claim:

1. A method of controlling at least one electromechanical member having ON-OFF operation initiated by periodic program signals represented either by the presence or by the absence of electric pulses and having to operate in a machine at a rate proportional to the operating speed of the latter, said program signals being produced according to a digital program driven at a mean speed that is proportional to said operating speed; said method including the steps of:

(a) generating a plurality of pulse sequences each having a frequency equal to the frequency of said ON-OFF operation rate and said sequences being phase shifted leading with reference to one another for the total amount of time between the first and last phases of said sequences to be shorter than the duration of each of said program signals, the pulses in said sequences having pulse duration shorter than pulse duration of said program signals and each of said sequences being attributed to a corresponding range of a plurality of successive ranges of increasing values of said machine operating speeds;

(b) selecting the one said pulse sequence which corresponds to the actual operating speed of said machine and transmitting information of a said program signal to said electromechanical member only when a pulse of said selected sequence appears; and (c) maintaining said electromechanical member in a program signal imposed position established by a said program signal until a next pulse of the selected sequence appears.

2. An apparatus for controlling at least one electromechanical member having ON-OFF operation initiated by periodic program signals represented either by the presence or by the absence of electric pulses and having to operate in a machine at a rate proportional to the operating speed of the latter, said program signals being produced according to a digital program driven at a mean speed that is proportional to said operating speed of the machine and there being pulse sequence and tachometric pulse generator means for producing a plurality of pulse sequences and tachometric pulses, each sequence corresponding to one of a plurality of successive ranges of increasing values of operating speeds of said machine and having a frequency equal to the frequency of said ON-OFF operation rate and the pulses in said sequences having pulse duration shorter than pulse duration of said program signals, said sequences being phase leading shifted with reference to one another for the total amount of time between the first and last phases of said sequences to be shorter than the pulse duration of each of said program signals, and said tachometric pulses having a period inversely proportional to said machine operating speed; said apparatus comprising:

(a) a tachometric circuit provided with an input for receiving said tachometric pulses and with outputs to deliver simultaneous tachometric signals produced in any one of a number of significant relations by said tachometric circuit for each said relation of said simultaneous signals to represent a different range in which the actual operating speed of said machine falls;

(b) a synchronizing circuit provided with a plurality of main inputs each for receiving one of said pulse sequences, with auxiliary inputs for receiving said tachometric signals, and with an output interrelated with said main and auxiliary inputs for said synchronizing circuit to select the one of said pulse sequences which corresponds to said relation of tachometric signals and issue control pulses at said output with said control pulses being shorter in duration than said program signals; and (c) a control circuit for each said electromechanical member, provided with a main input to receive the one of said succession of program signals which is destined for controlling said electromechanical member, with an auxiliary input connected to the output of said synchronizing circuit for receiving said control pulses, and with at least one output to be connected to said electromechanical member, said control circuit comprising gate means and bistable means, said gate means being arranged to transmit information of a said program signal to said bistable means only at the moment when one of said control pulses is received at said auxiliary input of said control circuit, and said bistable means being arranged for maintaining program signal imposed state until a next said control pulse appears at said auxiliary input of said control circuit.

3. An apparatus as claimed in claim 2, and adapted for the control of a knitting machine provided with a plurality of said electromechanical members including electromagnetic selectors for the knitting machine jacks, the actuation of said selectors being governed in accordance with said program signals delivered by a system of readers reading a multitrack digital program driven by said machine, characterized in that said input of said tachometric circuit and said main inputs of said synchronizing circuit are connected to a pulse generating system arranged to deliver said plurality of pulse sequences and said tachometric pulses, in that there is a said control circuit for each of said electromagnetic selectors, said control circuits having the auxiliary inputs thereof connected to said output of said synchronizing circuit, in that the outputs of said control circuits are respectively connected with said electromagnetic selectors, and in that the main input of each of said control circuits is connected with the reader associated with that track of said digital program which corresponds to the selector controlled by said control circuit.

4. An apparatus according to claim 2, in which said tachometric circuit, said synchronizing circuit, and said controlling circuit each includes elements of the NOR type.

References Cited

UNITED STATES PATENTS

| | | |
|---|---|---|
| 2,295,000 | 9/1942 | Morse. |
| 3,313,128 | 4/1967 | Schmidt et al. |
| 3,324,685 | 6/1967 | Schmidt et al. |
| 3,327,499 | 6/1967 | Schmidt et al. |
| 2,225,842 | 12/1940 | Page _____ 66—50 |
| 2,262,213 | 11/1941 | Tandler _____ 66—50 |
| 2,703,862 | 3/1955 | Gordon _____ 317—5 X |
| 2,829,229 | 4/1958 | Metz _____ 317—124 X |
| 2,944,157 | 7/1960 | McAuslan et al. ___ 317—124 X |
| 3,025,496 | 3/1962 | Schmid et al. _____ 317—137 |
| 3,089,321 | 5/1963 | Thurston _____ 66—50 X |
| 3,229,482 | 1/1966 | Farmer _____ 66—50 |
| 3,232,079 | 2/1966 | Levine _____ 66—154 |

FOREIGN PATENTS

| | | |
|---|---|---|
| 1,253,233 | 1/1961 | France. |

OTHER REFERENCES

Hiller: IBM Technical Disclosure Bulletin, vol. 1, No. 3, October 1958, p. 9.

W. CARTER REYNOLDS, Primary Examiner

340—147